April 28, 1964 K. T. MILLER 3,130,616
PLIERS WITH JAW LIMITING MEANS THEREFOR
Filed Feb. 21, 1963
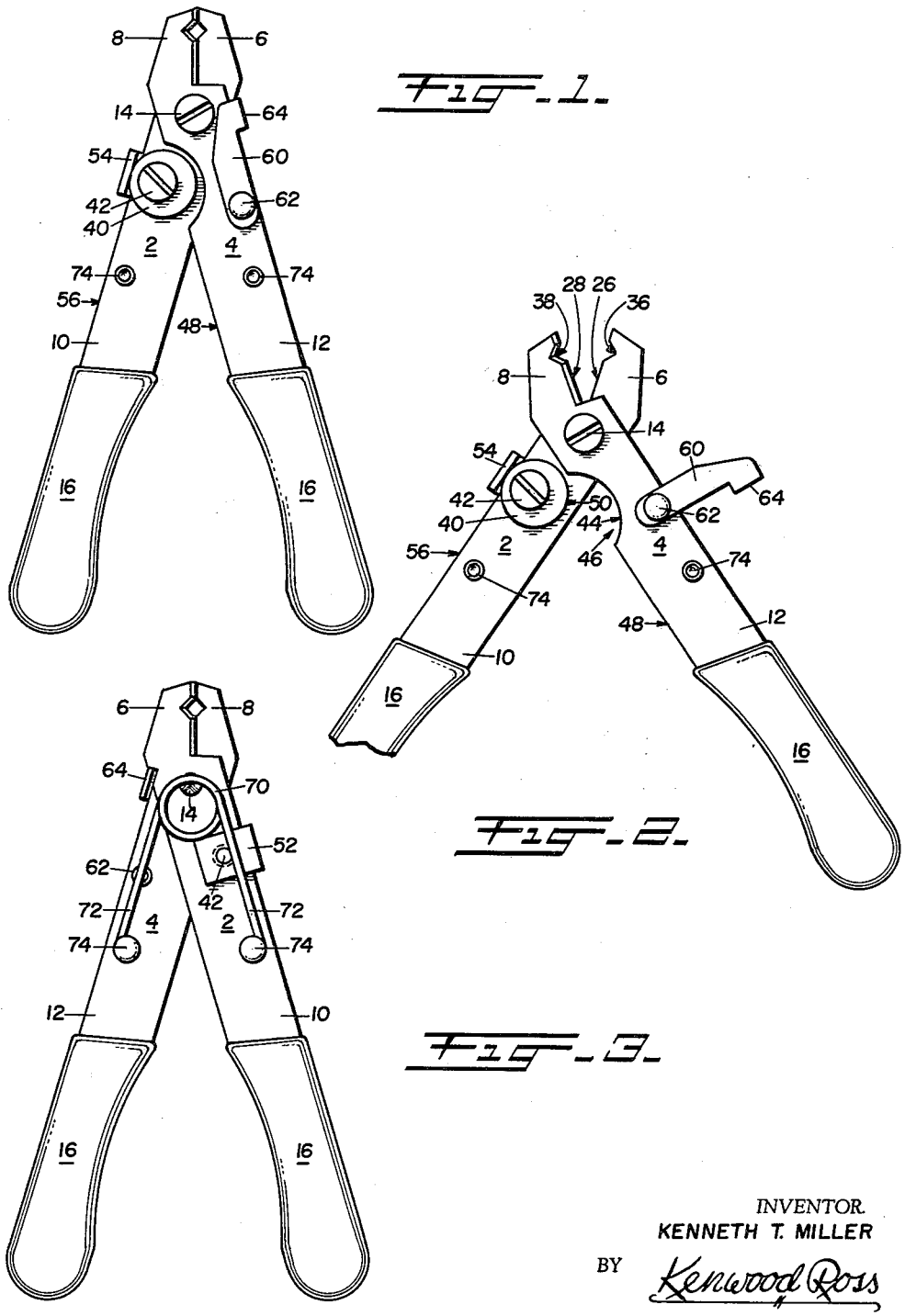
INVENTOR.
KENNETH T. MILLER
BY Kenwood Ross
ATTORNEY.

United States Patent Office

3,130,616
Patented Apr. 28, 1964

3,130,616
PLIERS WITH JAW LIMITING MEANS THEREFOR
Kenneth T. Miller, 68 Arlington Road,
Longmeadow, Mass.
Filed Feb. 21, 1963, Ser. No. 260,238
1 Claim. (Cl. 81—9.5)

The present invention relates to new and useful improvements and structural refinements in tools and is directed more particularly to the provision, in pliers and similar hand tools manipulatable in a plier-like manner, of means for adjustably limiting the movement of the jaws toward each other as is desirable in the case of wire-stripping pliers, orthodontist's crimping pliers, artisan's snips, and like hand tools.

The invention resides in the particular construction, arrangement, combination, and relationship of the various elements, components and instrumentalities of the tool, as exemplified in the detailed disclosure hereinafter set forth wherein the objects of the invention, as defined in the paragraphs below, will be apparent.

It is a principal object of the invention to provide an inventively novel and improved construction of a hand tool of a plier-like type, such as for stripping the covering or insulation from a wire so as to bare the same and/or for severing the wire, which hand tool incorporates novel means in the form of a stop which is manually adjustable to different positions on and relative to one of the arm members of the tool wherewith to effect adjustment of the extent of movement of the arm members toward each other, said stop being disposed in the path of the other arm member of the tool.

The construction is of the cam type and is such that the stop will remain fast in any set position relative to the arm member even though acted upon by the force applied to close the hand tool, means being provided to insure against accidental shifting of the stop during use or handling.

Furthermore, the hand tool hereof envisions means allowing rapid and accurate setting of the cam stop without supplemental tools.

The resultant improvement allows the only cam stop on a hand tool of the type envisioned which will not move from its preset position upon the closing of the arm members or jaws, and yet is loose enough so as to permit the setting thereof without the use of other tools.

By reason of such cam stop construction, a more compact tool is obtainable, with the cam stop ensuring improved stopping action in that it abuts an elongated bearing surface along an arc formed by a suitable adjacent recess provided in the tool.

Additionally, it is an object to provide a plier-type tool of the kind set forth which is economical to manufacture, easy to use, and efficient in carrying out the purposes for which it is designed.

These objects and other incidental ends and advantages reasonably appearing, some of which will in part be obvious and apparent and some of which will in part be more fully pointed out in the progress of the disclosure, it will be explained that the invention consists substantially in the combination, construction, location and relative arrangement of parts, as described in detail hereinafter, as shown in the annexed drawing, and as defined with particularity in the appended claim forming a part hereof.

There is illustrated herewith one form of physical embodiment of the invention capable of carrying the same into practical operation, it being understood that the elements therein exhibited may be varied or changed as to shape, proportion and precise manner of assemblage, all without departing from the spirit of the invention.

The invention accordingly embraces broadly the concept of a hand tool, such as for stripping insulation from or for cutting insulated wire or the like, comprising two pivotally-connected armlike members, the members on one side of the pivot being formed as blades having cutting edges cooperating after the manner of the cutting edges of scissor blades and permitting wire to be cut therebetween and being formed as handles on the other side of the pivot and incorporating therewith an adjustable stop means operating on the eccentric cam principle for limiting the closing of the handles and thereby the blades whereby an insulated wire, introduced into confronting notches in the blades, may be stripped of its insulation by the closing of the blades onto one another, or whereby a portion of the notch accommodating the wire within the insulation when the blades are closed permits the insulation to be stripped from the wire without any severing of the wire per se.

For a better understanding of the invention, one embodiment thereof will now be described in greater detail, with reference to the accompanying drawing, in which:

FIG. 1 is a front view of a tool embodying the teachings of the invention showing same in the almost "stopped" or fully closed position;

FIG. 2 is a view, similar to FIG. 1, showing the tool in an opened position; and FIG. 3 is a rear view of the tool of FIG. 1 showing same in the "caught" or partially closed position.

With continued reference to the drawing, I have shown a wire-stripping pliers as comprising a pair of generally similar elongated arm members, generally indicated by 2 and 4, each of which may be formed from flat or strip stock so as to provide jaw or blade portions 6 and 8 respectively and lower handle portions 10 and 12 respectively.

Intermediate portions of members 2 and 4 between the respective blade and handle portions are disposed in superposed relation as to each other and are pivotally interconnected as by a pivot screw 14 or equivalent means.

Portions of the handle portions 10 and 12 preferentially, but not obligatorily, are each covered with a covering material 16, such as plastic, rubber, or the like, for insulation purposes.

The opposed inner sides of the blade portions 6 and 8 are provided with cooperating sharpened cutting edges 26 and 28 respectively which are adapted to cooperate, after the manner of the cutting edges of the blades of a pair of scissors, to cut off wire or the like interposed therebetween, and are further provided with cooperating oppositely-facing V-shaped notches 36 and 38 respectively, each recessed inwardly from the respective cutting edge and likewise having sharpened edges which are adapted to cooperate to cut into the insulation covering or a wire interposed therebetween.

When blade portions 6 and 8 are brought into cutting relation, after the manner of blades of a pair of scissors, the V-shaped notches 36 and 38 first register at their bases, and then close toward one another until the apices of the V-notches approach an overlapping position.

The apices may, if desired, be slightly rounded so that, in the fully closed position of the tool, the apices of the V-notches are slightly separated and so that together they enclose a substantially circular area.

The cooperant V-shaped notches are so formed that, with the inner sides of the blade portions being brought into closed position, they will define an opening of a desired dimension so as to receive therethrough a wire of a predetermined size, the size of the opening and, accordingly, the extent of the depth of the cut, depending upon the position of an annular, disc-like stop 40 eccentrically and rotatably mounted on arm member 2 and held in any desired position as by a stop screw 42.

Said stop 40 is disposed on the same side of the arm member 2 as is the other superposed arm member 4 wherefore it will serve to intercept said superposed arm member 4, when the semi-circular wall 44 of a recess 46 in the longitudinal straight side edge 48 of arm member 4 contacts the outer circular periphery 50 of said stop, thereby ensuring that the blade portions 6 and 8 do not completely close to the point where the apices of the V-shaped notches 36 and 38 completely overlap.

By this combination of an annular stop and a semi-circular recess, a more compact tool is obtained, with the recess functioning to provide an improved bearing surface along an arc to insure positive stop action at all positions of adjustment of the stop.

The degree of closing may be adjusted by adjustment of eccentric stop 40 and, if desired, said stop may be calibrated with wire diameters.

In operational use, the wire to be stripped is placed been the V-shaped notches 36 and 38 and the blade portions 6 and 8 are closed until wall 44 of recess 46 of arm member 4 abuts against stop 40 on arm member 2 and prevents the handle portions 10 and 12 from being further moved toward each other.

The sharpened edges of the V-shaped notches 36 and 38 cut through the insulation of the wire, but the wire itself remains unsevered in the gap formed by the area between the apices of the V-notches. With the insulated wire held in the hand, the insulation may be stripped therefrom, by pulling upon the hand tool.

And if it is desired to sever the wire, same may be achieved by shearing the wire between the unnotched cutting edges 26 and 28 of the blade portions 6 and 8 near the pivotal connection 14.

The stop screw 42 includes a head and a threaded coaxial shank which extends through an opening in stop 40 at one side of the center thereof and is in threaded engagement with an opening through arm member 2.

At the opposite side of arm member 2, a stop nut 52 is provided which is in threaded engagement with stop screw 42.

Said stop nut 52 is provided with an upturned side edge 54 at one side thereof which embraces an adjacent side edge 56 of arm member 2. By reason of upturned side edge 54 being embraceable against the side edge 56, undesired rotation of the stop nut 52, and consequently of the annular stop 40, is prevented.

Said stop screw 40 and stop nut 52 cooperate to secure the stop 40 at any desired position of adjustment to preclude movement by a component of the force applied to the handles 10 and 12 of the pliers when the wall 44 of recess 46 circumscribes the stop 40.

To rotate stop 40, screw 42 must be loosened, whereupon the stop may be manually rotated to the desired position and thereafter the screw may be tightened again so as to hold the stop in the selected position.

As aforestated, a portion of the peripheral or side edge 50 of annular stop 40 is adapted to abut an inner edge of the other of said handle portions in manner to limit the movement of the handles and thereby the jaws in a closed position.

The stop 40 being eccentrically disposed, may be variously adjusted at the will of the operator so that the blade portions 6 and 8 may be closed to any desired degree. For instance, it may be desirable that the blade portions be closed only to the extent that the V-notches 36 and 38 thereof will cut through the covering of a wire but will not injure the wire to be stripped.

Releasable catch means includes a member 60 pivoted at 62 to handle 4 of the tool and having a projection 64 for engaging in a suitable notch of the other handle in its locking position, as best shown in FIG. 3.

The catch enjoys a reasonably tight fit so as to be held normally in the locking position shown in FIG. 3, it being desired that the tool not be allowed to spring open, under the force of the spring means yet to be described, when not in use.

When it is desired to spread the jaws apart, the projection 64 of the releasable catch means may be manually disengaged from the notch, as shown in FIG. 2, so as to permit the opening of the blade portions 6 and 8 for the insertion there-between of the wire to be stripped and/or cut.

Spring means includes an elongated spring wire which is coiled intermediate its ends at 70 and has opposite lower ends 72 secured to the arm members 2 and 4 by rivets 74 or the like. Said spring means is arranged to urge the handle portions and the blade portions apart, or against the releasable catch means when the tool is in its locking position, as in FIG. 3.

This invention is capable of various forms and numerous applications without departing from the essential features herein disclosed. It is therefore intended and desired that the embodiment herein shall be deemed illustrative and not restrictive and that the patent shall cover all patentable novelty herein set forth; reference being had to the following claim rather than to the specific description herein to indicate the scope of this invention.

I claim:

In a plier-like tool, a pair of similar elongated arms connected in pivotal relation intermediate their respective ends and each formed to have an upper jaw portion and a lower handle portion, said elongated arms being disposed in superposed relation with the adjacent flat faces thereof in contiguous relation, a pivotal connection between said elongated arms for the swinging of the lower handle portions towards and away from one another and the simultaneous swinging of the upper jaw portions into and out of superposed relation, the upper jaw portions formed to have inner and adjacent longitudinal faces extending upwardly away from the axis of said pivotal connection and arranged to provide opposed and cooperating wire stripping areas adjacent the outer ends of the upper jaw portions, the wire stripping areas including aligned and cooperating open V notches having bevelled side edges, the inner faces of the upper jaw portions being related to the V notches of the wire stripping areas whereby when in abutment the V notches cooperantly define an opening for receiving wire of a certain minimum diameter, resilient means urging the jaw portions apart, a member including an annular disc-like stop eccentrically and rotatably mounted on one of said elongated arms, the other of said elongated arms having a curved recess therealong for accommodating one side of said stop, the curve of the recess being in a plane substantially perpendicular to the axis of said stop, said stop being adapted to be adjustably positioned relative to the recess and engaged therewith for variously limiting closed positions of said elongated arms, locking means for releasably locking said elongated arms in closed position against opening movement, said stop being lockable on its mounting whereby an insulated wire introduced into the defined opening may be stripped of its insulation by closing the jaw portion onto one another, a portion of the notch accommodating the wire within the insulation when the blades are closed, thereby permitting the insulation to be stripped from the wire without severing the wire itself.

References Cited in the file of this patent

UNITED STATES PATENTS

| | | |
|---|---|---|
| 1,289,381 | Brumfield | Dec. 31, 1918 |
| 2,600,445 | Sunstrand | June 17, 1952 |
| 2,721,383 | Miller | Oct. 25, 1955 |

FOREIGN PATENTS

| | | |
|---|---|---|
| 749,793 | Great Britain | May 30, 1956 |
| 164,154 | Sweden | July 29, 1958 |